US012741596B2

(12) United States Patent
Traore

(10) Patent No.: US 12,741,596 B2
(45) Date of Patent: Sep. 22, 2026

(54) SEAMLESS MOUNT APPARATUS FOR MOUNTING COMPUTING DEVICES IN VEHICLES

(71) Applicant: Gaoussou Traore, Irving, TX (US)

(72) Inventor: Gaoussou Traore, Irving, TX (US)

( * ) Notice: Subject to any disclaimer, the term of this patent is extended or adjusted under 35 U.S.C. 154(b) by 53 days.

(21) Appl. No.: 18/894,052

(22) Filed: Sep. 24, 2024

(65) Prior Publication Data

US 2026/0084628 A1 Mar. 26, 2026

(51) Int. Cl.
*B60R 11/02* (2006.01)
*B60R 11/00* (2006.01)

(52) U.S. Cl.
CPC ... *B60R 11/0252* (2013.01); *B60R 2011/0005* (2013.01); *B60R 2011/0063* (2013.01); *B60R 2011/007* (2013.01); *B60R 2011/0085* (2013.01)

(58) Field of Classification Search
CPC ......... B60R 11/0252; B60R 2011/0005; B60R 2011/0063; B60R 2011/007; B60R 2011/0085
See application file for complete search history.

(56) References Cited

U.S. PATENT DOCUMENTS 7,236,863 B2 * 6/2007 LaPorte .............. B60R 11/0252 361/679.41
9,010,597 B2 * 4/2015 Prescott .................. B60R 7/088 224/547
D769,235 S * 10/2016 Li ................................ D14/251
11,034,309 B2 * 6/2021 Chow .................... F16M 13/00
D938,409 S * 12/2021 Zheng .......................... D14/253
11,235,710 B1 * 2/2022 Shumaker .......... F16M 11/2028
11,473,601 B2 * 10/2022 Fan .................... F16M 11/2064
D986,235 S * 5/2023 Chen ............................ D14/251
12,279,394 B2 * 4/2025 Cai ....................... G06F 1/1626
(Continued)

OTHER PUBLICATIONS

Syncwire Fits MagSafe Car Mount for Universal Dashboard, sold on amazon.com, first available date: Oct. 27, 2023, https://www.amazon.com/SYNCWIRE-MagSafe-Universal-Dashboard-Magnetic/dp/B0CLXMFD8C?th=1 (Year: 2023).*
(Continued)

*Primary Examiner* — Terrell L Mckinnon
*Assistant Examiner* — Ding Y Tan
(74) *Attorney, Agent, or Firm* — Richard Eldredge; Leavitt Eldredge Law Firm

(57) ABSTRACT

A seamless mount apparatus for vehicles is designed to accommodate non-computing devices and computing devices of varying sizes, which include, but not limited to, iPads, tablets, smartphones, without compromising stability or functionality. The seamless mount apparatus comprises a base, at least one arm, a docking tray, an insert member. The seamless mount apparatus is easily detached and transferred to other vehicles, allowing a user to reuse the apparatus across multiple vehicles, thus increasing its long-term value. The docking tray with magnets and sturdy design of the seamless mount apparatus ensure that the computing device remains secure, even when the vehicle encounters rough terrain, sharp turns, or potholes. This prevents accidental falls of the computing device. The arm is adjustable, allowing the user to easily raise or lower the computing device to access the vehicle's built-in controls or infotainment system without obstruction.

20 Claims, 10 Drawing Sheets

(56) References Cited

U.S. PATENT DOCUMENTS

| | | | | |
|---|---|---|---|---|
| 2008/0295301 | A1* | 12/2008 | Carnevali | F16M 13/022<br>24/569 |
| 2021/0387576 | A1* | 12/2021 | Soon | B60R 11/02 |
| 2024/0308436 | A1* | 9/2024 | Yao | F16M 11/041 |
| 2025/0001860 | A1* | 1/2025 | Velusamy | B60Q 3/16 |

OTHER PUBLICATIONS

Bracketron HD (Heavy-Duty) Tablet Dock Portable Dash & Window Clamp Mount—BX1-588-2, Dash+Window sold on amazon, first available date: Jan. 14, 2020 (Year: 2020).*

Vicseed True Military-Grade Car Phone Holder [Upgraded Strongest Suction & Patent Certs] for iPhone 17 Pro Max 16 15 Android, first available date May 20, 2019, https://www.amazon.com/dp/B07R1QZ8V1/ref=sspa_dk_detail_2? (Year: 2019).*

* cited by examiner

SEAMLESS MOUNT APPARATUS FOR MOUNTING COMPUTING DEVICES IN VEHICLES

FIELD OF INVENTION

The present disclosure relates generally to mount apparatus, and more particularly to a seamless mount apparatus that is designed to be installed or removed within minutes, making it convenient for users who need a fast solution without the complexity of traditional aftermarket infotainment systems.

BACKGROUND

In today's rapidly evolving automotive industry, the need for enhanced infotainment systems has become more pronounced. Many drivers rely on built-in navigation, entertainment, and backup camera systems to assist in their daily commutes. However, numerous vehicles, especially older models or base trims of new vehicles, lack advanced infotainment capabilities or have outdated, cumbersome systems. Moreover, the infotainment system on new vehicles always slows down after a few years due to environmental factors such as heat, humidity, road and vibration, thereof, and do not get recurring updates.

The lack of a modern infotainment system in many vehicles, especially older models, poses a challenge for drivers. Many vehicles either don't have a navigation system or include systems with small screens that are difficult to use, especially for individuals with vision issues. Additionally, the absence of safety features like backup cameras further exacerbates the issue, creating a less convenient and less safe driving experience.

Drivers can use their smartphones for navigation, mounting them on their dashboards. Though easily available, smartphones have smaller screens compared to modern infotainment systems, making it harder to use. They can also be distracting when notifications, calls, or texts come through, and frequently require charging during long trips.

Companies that offer retrofitting infotainment systems typically provide larger screens and enhanced features, but these upgrades come at a high cost and require extensive modifications to the vehicle's dashboard, often involving cutting and drilling. The installation process is cumbersome and time-consuming. Additionally, because these systems are permanently installed, they must prioritize durability in extreme heat or cold, which often compromises overall performance. Their software is also typically non-upgradable. In contrast, my design allows for the tablet to be removed in just one second, eliminating concerns about extreme temperatures affecting its performance while ensuring the device remains up-to-date and functional with the latest software.

Some drivers use tablets in their vehicles, mounted using various universal stands or mounts. Current mounts for tablets often don't provide enough stability. Many are prone to letting the tablet fall during sudden movements, such as hitting potholes or making sharp turns. Additionally, these systems lack seamless integration with the vehicle's existing controls and may obstruct the dashboard or other essential features.

The seamless mount apparatus offers a solution that mitigates many of these shortcomings by providing a stable, reusable, and easy-to-install mount.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key nor critical elements of all embodiments, nor delineate the scope of any or all embodiments.

The present disclosure, in one or more embodiments, relates a seamless mount apparatus that is designed to be installed or removed within minutes, making it convenient for users who need a fast solution without the complexity of traditional aftermarket infotainment systems.

An embodiment of a first aspect, a seamless mount apparatus for vehicles. The seamless mount apparatus comprises a base, at least one arm, a docking tray, an insert member. The seamless mount apparatus is designed to accommodate computing devices of varying sizes that include, but not limited to, iPads, tablets, notebooks, smartphones, and chromebooks without compromising stability or functionality.

In another embodiment herein, the seamless mount apparatus is configured to accommodate at least one non-computing device of varying sizes includes, but not limited to, GPS devices, cameras, speakers, medical devices, and thereof without compromising stability or functionality.

An embodiment of the first aspect, the base is coupled to a vehicle's dashboard using one or more fasteners. The fasteners comprise an adhesive material include, but not limited to, a pressure-sensitive adhesive, a heat waterproof heat resistant double-sided tape, or a high-bonding adhesive, allowing for non-invasive attachment to the vehicle's dashboard without requiring drilling or other permanent modifications. The base is made of a lightweight material comprises aluminum.

An embodiment of the first aspect, the arm is pivotally connected to the base through a pivotable hinge member. The pivotable hinge member is configured to rotate the arm between a first position and a second position, causing the docking tray, which is coupled to the arm, to rotate about multiple axes, alternating between corresponding the first and second positions.

An embodiment of the first aspect, the docking tray is slidably connected to the arm through a connector unit. The connector unit is positioned at a rear surface of the docking tray. The connector unit is configured to adjust height of the docking tray to accommodate different vehicle dashboard configurations based on a user requirement.

In one embodiment, the arm is configured with a slot. The slot is adapted for receiving a flange of the connector unit. The flange is operable secured within the slot through a knob for securely attaching the connector unit of the docking tray to the one arm, allowing the docking tray to be attached to the one arm. The arm is detachable from the connector unit of the docking tray by loosening the knob, allowing the docking tray to be easily transferred between different vehicles without requiring additional components.

The docking tray has a recess shaped and dimensioned for securing a computing device. The recess of the docking tray further comprises a magnet cover that conceals and protects one or more magnets while allowing secure and seamless attachment of the computing device. The docking tray is made of a lightweight material comprises aluminum.

An embodiment of the first aspect, the insert member is configured to attach to a rear surface of the computing device. The insert member is shaped and dimensioned to be removably inserted into the recess of the docking tray, thereby securely attaching the computing device to the docking tray. The insert member comprises a layered structure with at least 5 mm thick polycarbonate material and at least 1.5 mm thick stainless-steel material, providing both flexibility and magnetic attachment capability to the recess of the docking tray.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1:
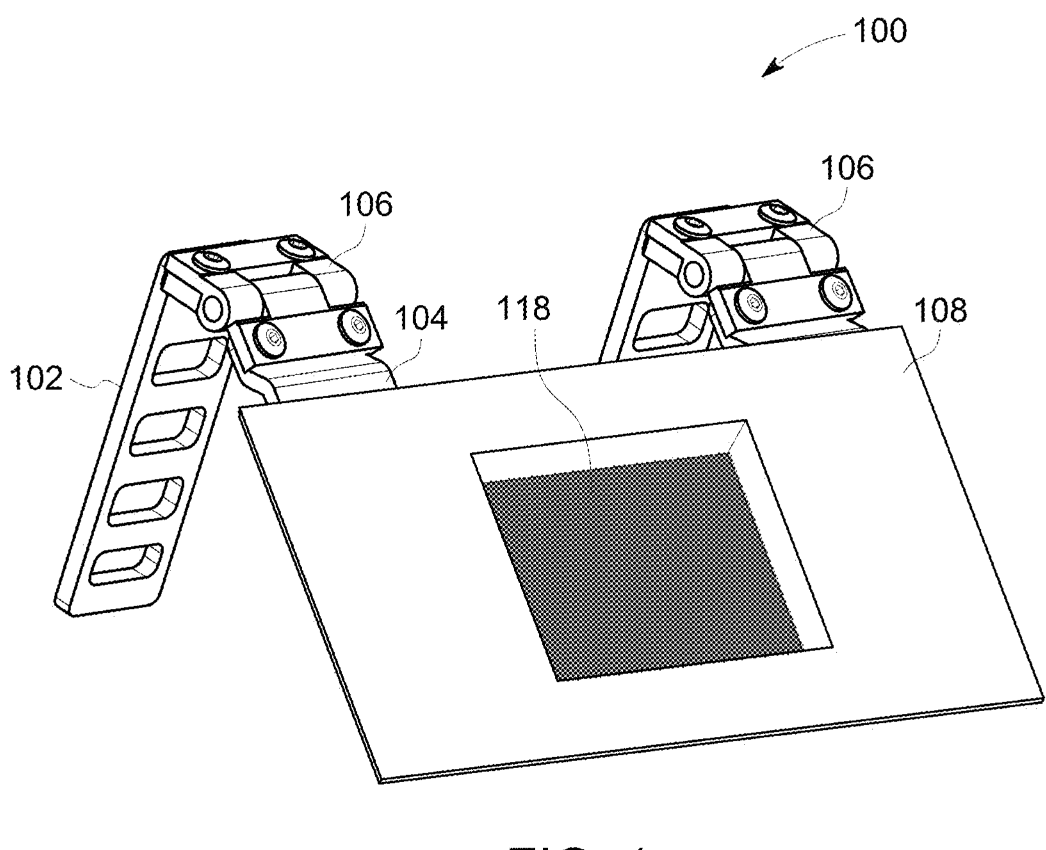
FIG. 1 illustrates a perspective view of a seamless mount apparatus for vehicles, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

FIG. 1 refers to a perspective view of a seamless mount apparatus 100 for vehicles. The seamless mount apparatus 100 comprises a base 102, at least one arm 104, a docking tray 108, and an insert member 114. The seamless mount apparatus 100 is designed to accommodate computing devices of varying sizes that include, but not limited to, iPads, tablets, notebooks, smartphones, and chromebooks without compromising stability or functionality.

In another embodiment herein, the seamless mount apparatus 100 is designed to accommodate at least one non-computing device of varying sizes includes, but not limited to, GPS devices, cameras, speakers, medical devices, and thereof without compromising stability and functionality.

Figure 2:
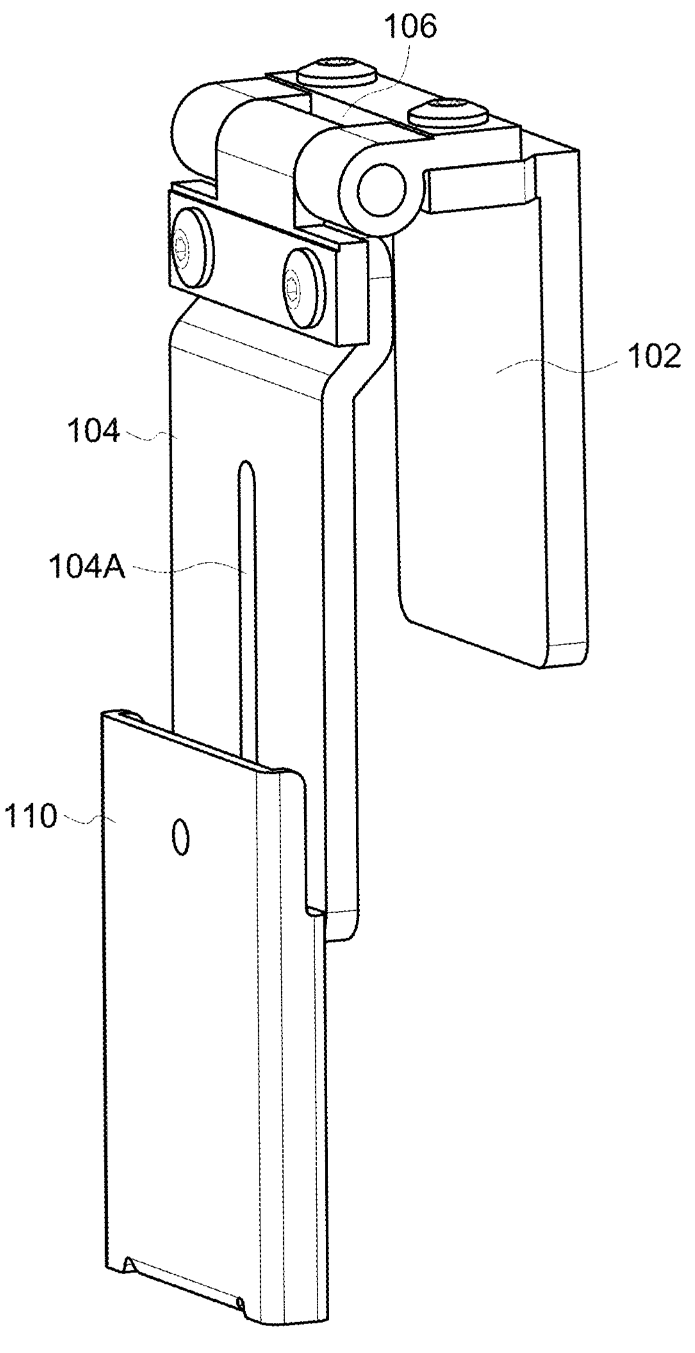
FIG. 2 illustrates a perspective view of at least one arm attached to at least one base of the seamless mount apparatus, in accordance with embodiments of the invention.

FIG. 2 refers to a perspective view of the arm 104 attached to the base 102. The base 102 is coupled to a vehicle's dashboard using one or more fasteners 102A. The fasteners 102A comprise an adhesive material include, but not limited to, a pressure-sensitive adhesive, a heat waterproof heat resistant double-sided tape, or a high-bonding adhesive, allowing for non-invasive attachment to the vehicle's dashboard without requiring drilling or other permanent modifications.

The base 102 is constructed from a lightweight material comprises aluminum 5052. The adhesive material eliminates the need for drilling, cutting, or permanently altering the vehicle's dashboard, making installation simple and reversible without damaging the vehicle.

Figure 3:
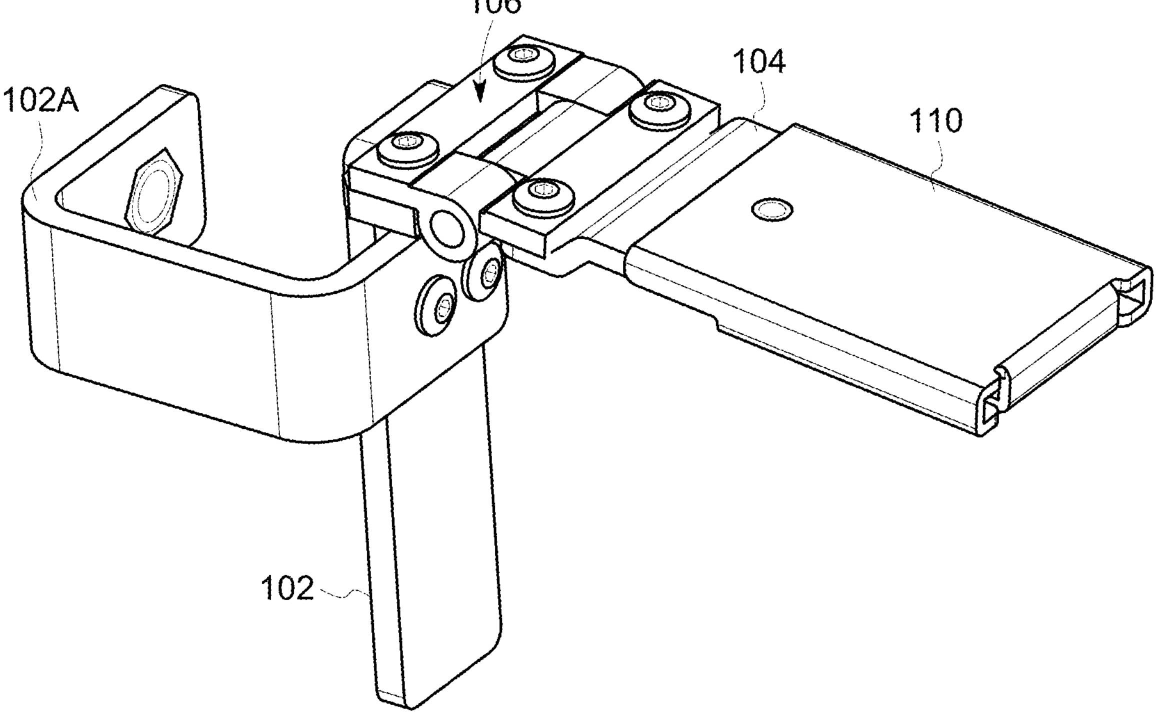
FIG. 3 illustrates a perspective view of another embodiment of a fastener of the base, in accordance with embodiments of the invention.

FIG. 3 refers to another embodiment of a fastener 102A of the one or more fasteners. The fastener 102A comprises, but is not limited to, a clamper, a clip, and a holder mechanism. This mechanism is designed to firmly secure the base 102 to the vehicle's dashboard by clamping onto or clipping around the vehicle's dashboard, ensuring a stable and reliable attachment. This type of fastener 102A provides an additional method of securing the base 102, offering versatility in how the docking system can be mounted and accommodated across different vehicle types and dashboard configurations.

Referring to FIG. 2, the arm 104 is pivotally connected to the base 102 through a pivotable hinge member 106. The pivotable hinge member 106 is specifically designed to enable rotational movement of the arm 104 between a first position and a second position. As the arm 104 pivots, it causes the docking tray 108, which is attached to the arm 104, to rotate around multiple axes. This movement allows the docking tray 108 to alternate between corresponding the first and second positions.

The pivotable hinge member 106 facilitates this multi-axial rotation, providing the flexibility to adjust the orientation of the docking tray 108 according to user needs or vehicle constraints. This feature ensures that the docking tray 108 can be positioned for optimal visibility, accessibility, and ergonomic comfort, accommodating various configurations and preferences.

In one embodiment, the pivotable hinge member 106 is designed to stop at any angle within its range of motion, allowing for precise positioning and flexibility in its operation. This feature ensures that the pivotable hinge member 106 can be adjusted to any desired angle, providing enhanced control in applications where varying degrees of movement are necessary. Additionally, the pivotable hinge member 106 is constructed from materials or incorporates a design that provides heat resistance, allowing it to maintain its structural integrity and functionality when exposed to elevated temperatures. This makes the pivotable hinge member 106 suitable for use in environments where high heat or temperature fluctuations may occur, ensuring durability and consistent performance under demanding conditions.

The docking tray 108 is slidably connected to the arm 104 through a connector unit 110. The connector unit 110 is positioned at a rear surface of the docking tray 108. The connector unit 110 is configured to adjust height of the docking tray 108 to accommodate different vehicle dashboard configurations based on a user requirement. This adjustment capability ensures that the docking tray 108 can be positioned at an optimal height, based on the specific requirements and preferences of the user, to accommodate different dashboard setups and improve usability.

Figure 4:
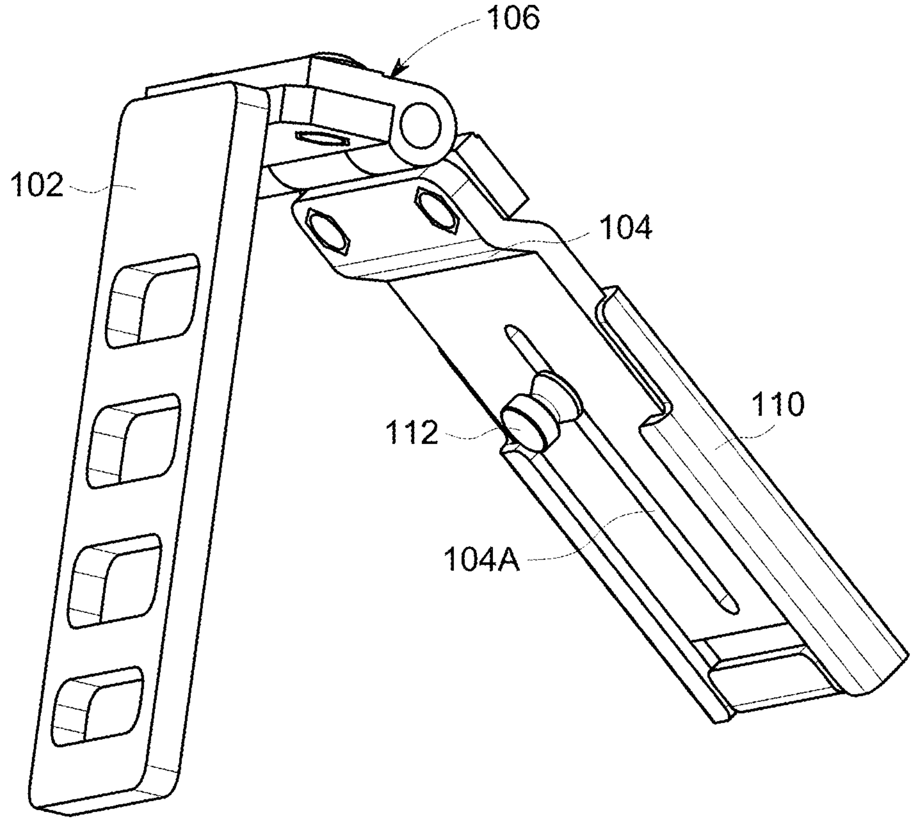
FIG. 4 illustrates a perspective rear view of the arm attached to the base, in accordance with embodiments of the invention.

FIG. 4 refers to a perspective rear view of the arm 104 attached to the base 102. In one embodiment, the arm 104 is configured with a slot 104A. The slot 104A is adapted for receiving a flange 110A of the connector unit 110. The slot 104A is an elongated opening strategically positioned on the arm 104, allowing for a range of vertical movement of the flange 110A. This design enables the flange 110A, and consequently the docking tray 108, to be adjusted in height.

The elongation of slot 104A provides sufficient space for the flange 110A to slide up and down within it, facilitating precise adjustments to height of the docking tray 108. This adjustability ensures that the docking tray 108 can be positioned at the most suitable height for various vehicle dashboard configurations, allowing for a customizable and ergonomic setup.

In a preferred embodiment, the seamless mount apparatus 100 comprises a pair of bases 102 connected to respective arms 104, as shown in FIG. 1. Each base 102 is designed to be connected with at least one arm 104, allowing for a versatile and secure mounting system. This dual-base configuration enhances the stability and support of the seamless mount apparatus 100, ensuring that it can effectively handle varying weights and forces. The design provides additional flexibility in positioning and adjusting the mounted device, accommodating different user needs and vehicle configurations.

Figure 5:
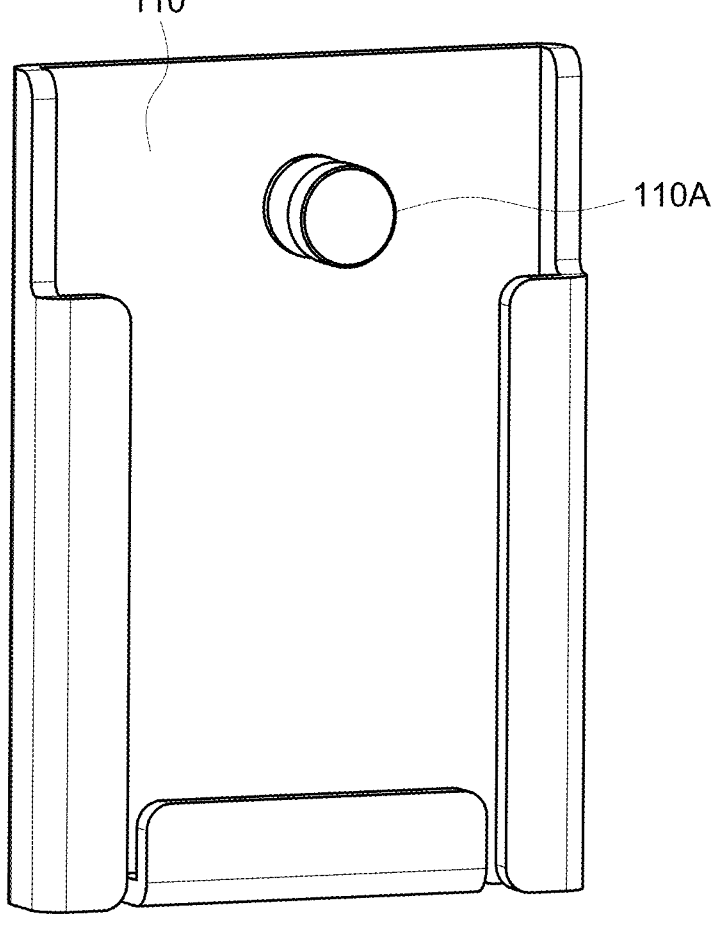
FIG. 5 illustrates a rear view of a connector unit of the seamless mount apparatus for vehicles, in accordance with embodiments of the invention.

FIG. 5 refers to a rear view of the connector unit 110. The flange 110A is operable secured within the slot 104A through a knob 112 for securely attaching the connector unit 110 of the docking tray 108 to the arm 104, allowing the docking tray 108 to be attached to the arm 104. The arm 104 is detachable from the connector unit 110 of the docking tray 108 by loosening the knob 112, allowing the docking tray 108 to be easily transferred between various vehicles without requiring additional components.

Figure 6:
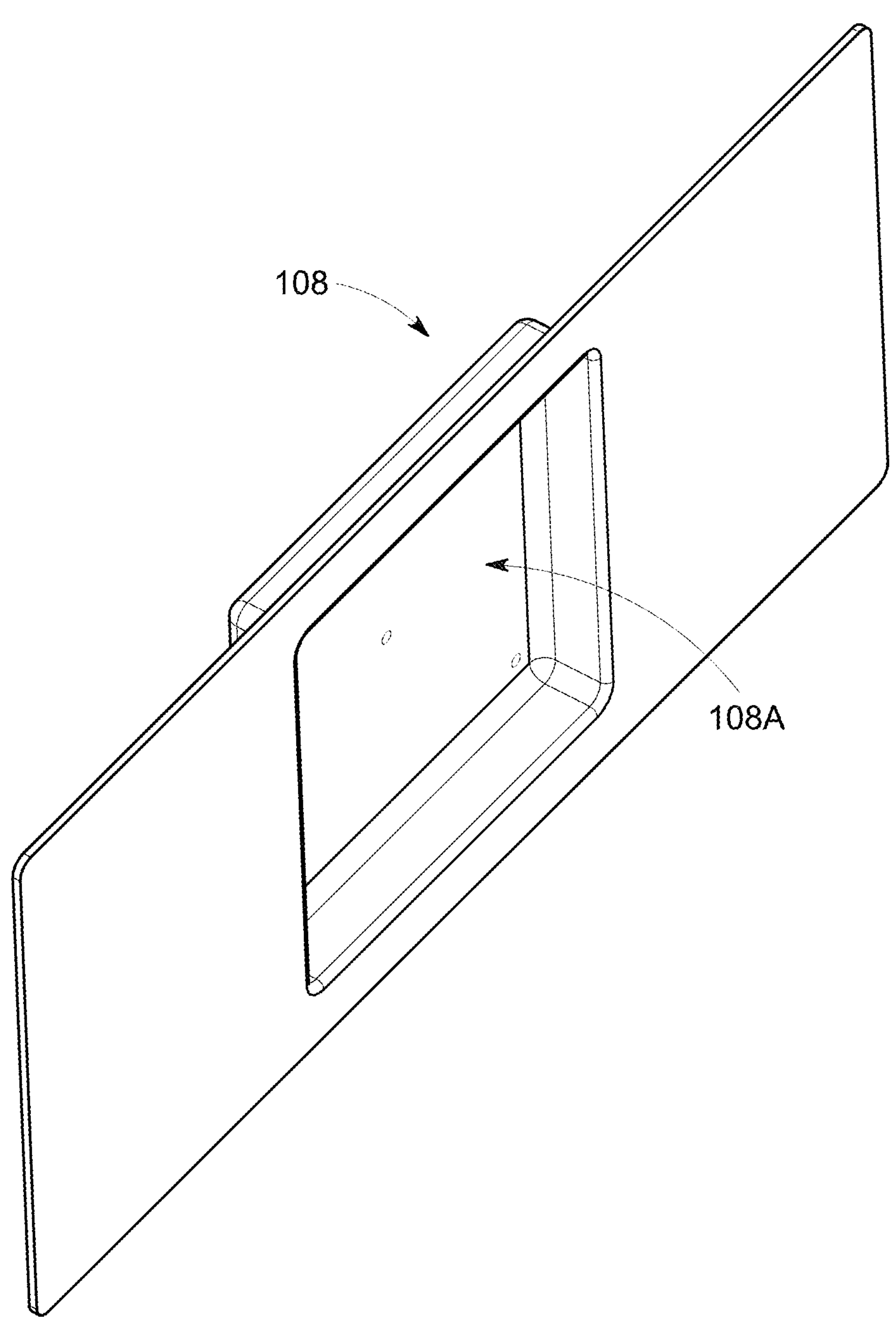
FIG. 6 illustrates a perspective front view of a docking tray of the seamless mount apparatus, in accordance with embodiments of the invention.

FIG. 6 refers to a perspective front view of the docking tray 108. The docking tray 108 has a recess 108A shaped and dimensioned for securing a computing device 10. The recess 108A of the docking tray 108 further comprises a magnet cover 118. The magnet cover 118 is configured to conceal and protect one or more magnets 119 embedded within the recess 108A while allowing secure and seamless attachment of the computing device 10.

In one embodiment, the docking tray 108 is made of a lightweight material comprises aluminum. The dimensions of the docking tray 108 are adjustable to meet varying user requirements. For instance, the length of the docking tray 108 ranges from 10 to 12 units, providing flexibility in accommodating different sizes of computing devices or preferences for a docking setup. The breadth of the docking tray 108 varies between 5 to 6 units, allowing for further customization in dimensions of the docking tray 108.

The recess 108A within the docking tray 108, which is designed to securely house the insert member 114, which is attached to the computing device 10, also has adjustable dimensions to ensure a proper fit. The length of the recess 108A ranges from 4 to 5 units, while the breadth of the recess 108A varies from 4 to 5 units. This range ensures that the recess 108A can accommodate the insert member 114 of different sizes while maintaining a secure and stable fit. Additionally, the depth of the recess 108A ranges from 0.6 to 0.8 units, providing sufficient space for the insert member 114 to be securely positioned within the recess 108A. This adjustable depth aids to cater to different device thicknesses and ensures a snug fit.

Figure 7:
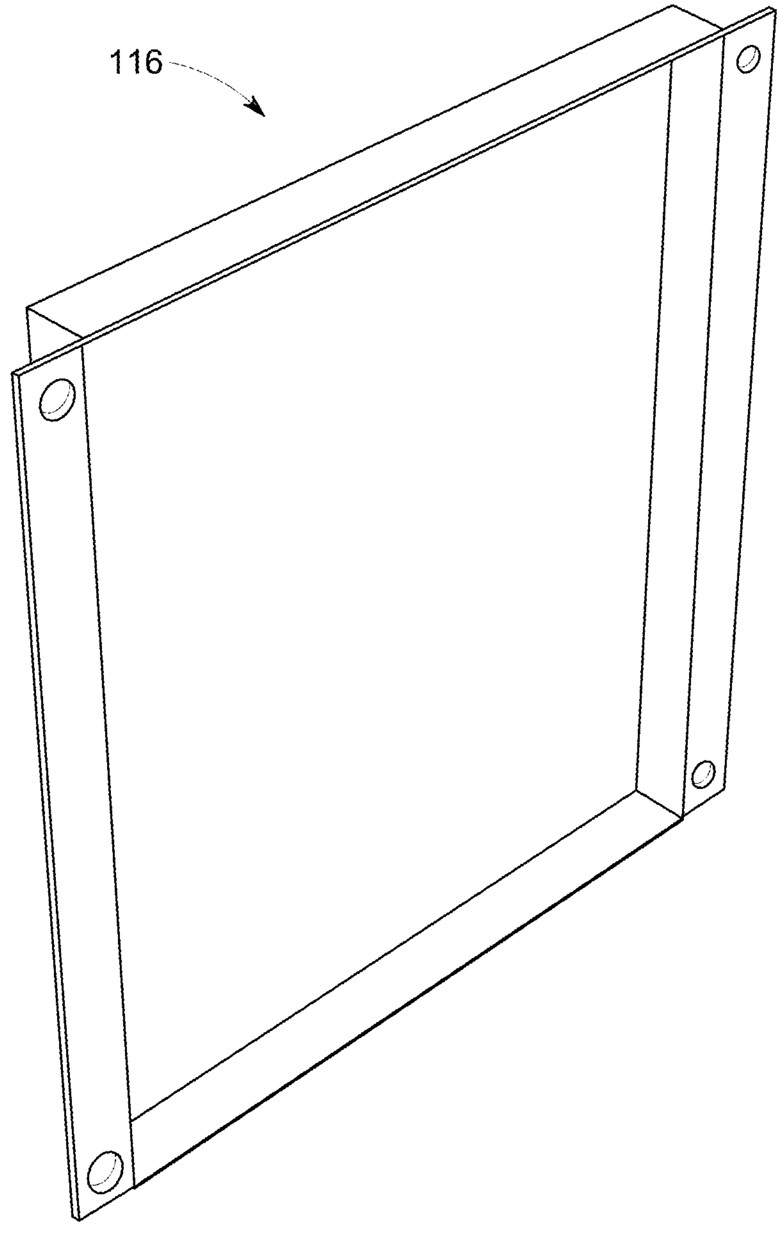
FIG. 7 illustrates a perspective front view of a magnet shield of the seamless mount apparatus, in accordance with embodiments of the invention.

FIG. 7 refers to a perspective front view of a magnet shield 116. The magnet shield 116 is strategically positioned on top of the magnets 119 located within the recess 108A of the docking tray 108. The magnet shield 116 is secured in place using screws, which are threaded into corresponding fittings. The magnet cover 118 enhances the visual appeal of the docking tray 108, and also obscures the screws of the magnet shield 116, providing a clean and polished appearance. The combination of these components ensures both functional performance and aesthetic integration in the docking tray 108.

Figure 8:
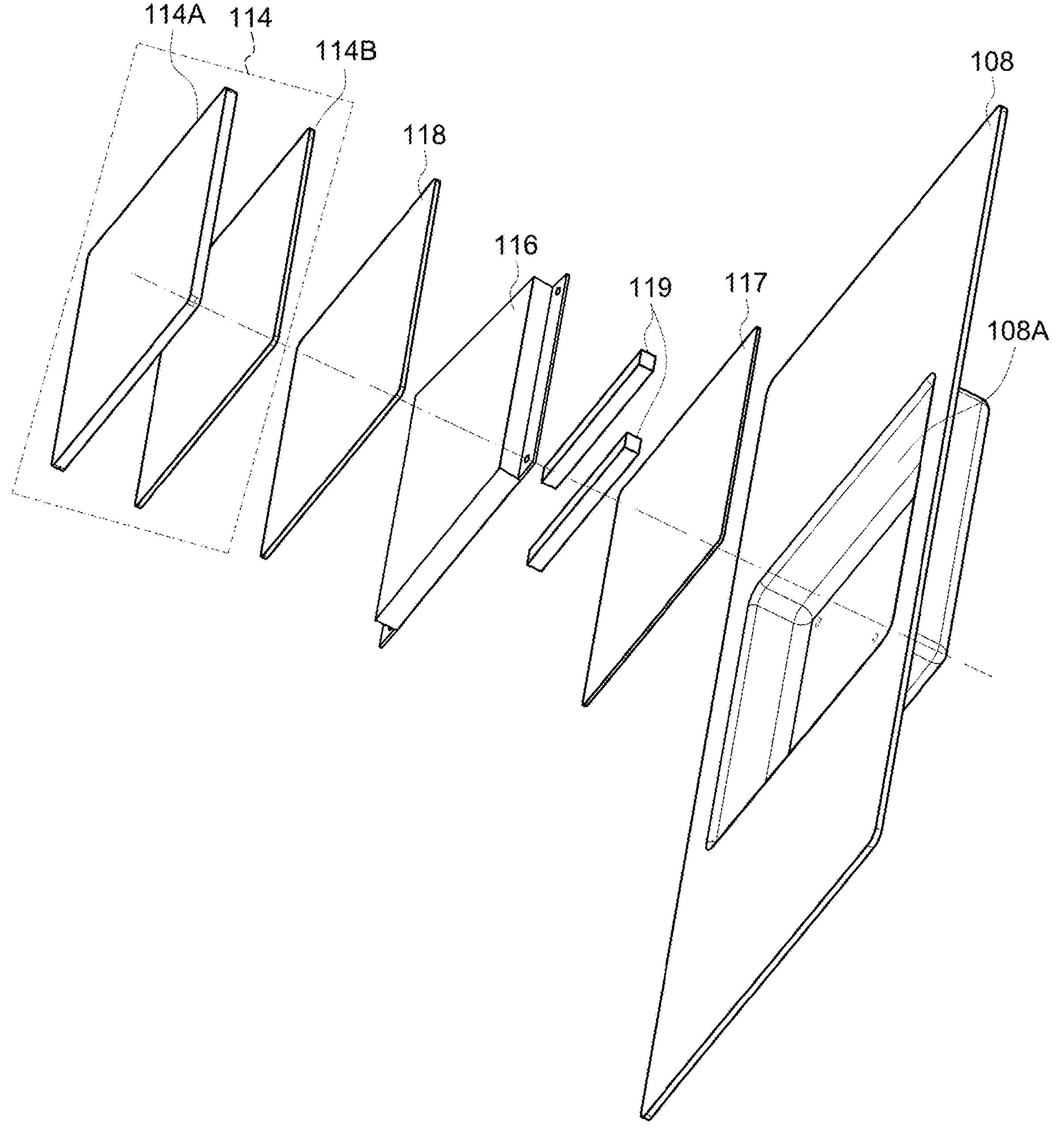
FIG. 8 illustrates an exploded view of the docking tray, in accordance with embodiments of the invention.

FIG. 8 refers to an exploded view of the docking tray 108, and the insert member 114. The recess 108A in the docking tray 108 is designed with a multi-layered structure that serves both functional and aesthetic purposes. At a bottom surface of the recess 108A, a metal plate 117 is placed to provide structural support for the magnets 119 and enhances the magnetic field by creating a stable, conductive surface. On top of the metal plate 117, the magnets 119 are placed to enable secure magnetic docking. The magnet shield 116 is positioned above the magnets 119 to protect the magnets 119 from external interference and contain the magnetic field within a controlled area, preventing unintended attraction or electromagnetic interference with nearby any devices. Finally, the magnet cover 118 is placed on top to provide a polished, seamless appearance. The magnet cover 118 is configured to conceal the underlying components, such as the magnet shield 116, and further hides the screws used to fasten the magnet shield, 116 resulting in a clean, professional finish that enhances the overall visual appeal of the docking tray 108.

Figure 10:
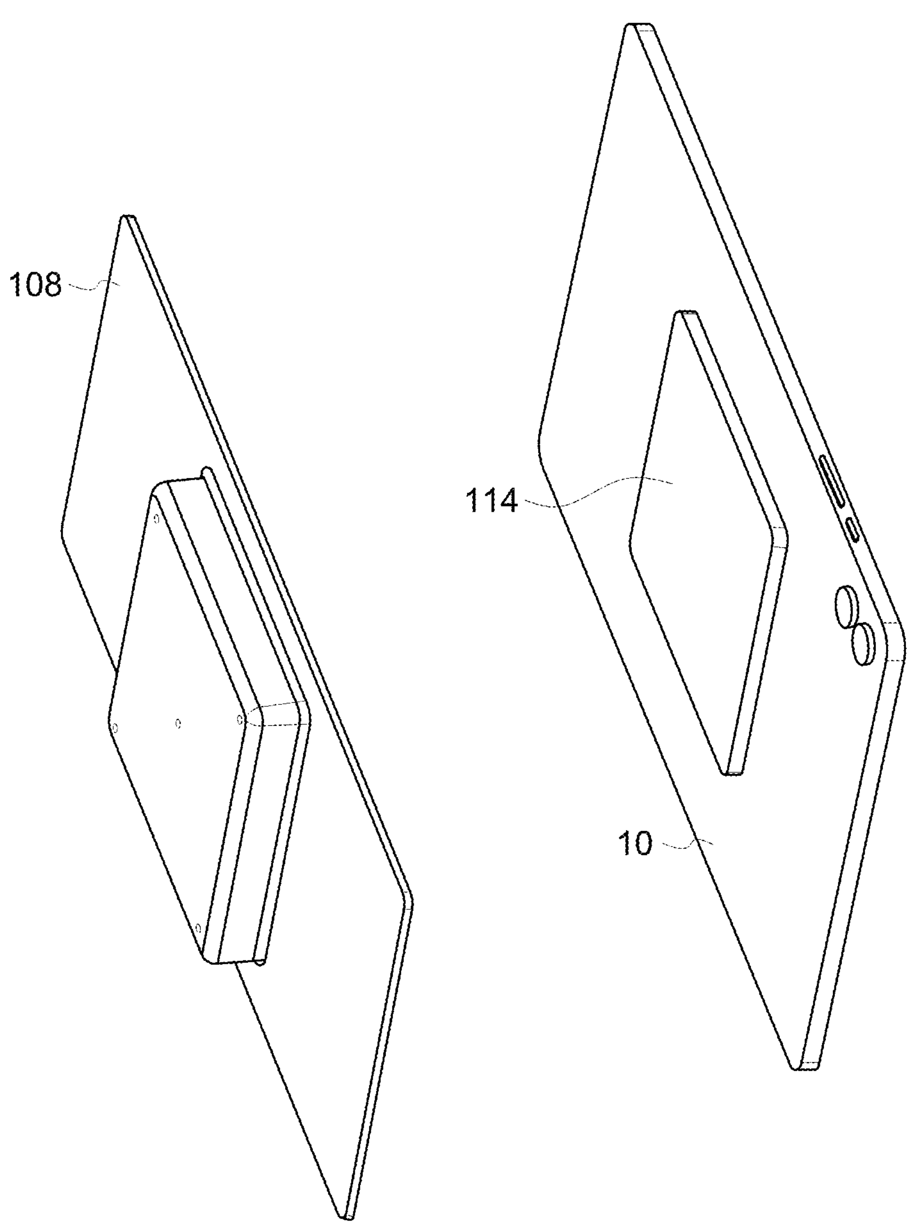
FIG. 10 illustrates a rear view of the computing device mounted on the seamless mount apparatus, in accordance with embodiments of the invention.

The insert member 114 is configured to attach to a rear surface of the computing device 10, as shown in FIG. 10. The insert member 114 is shaped and dimensioned to be removably inserted into the recess 108A of the docking tray 108, thereby securely attaching the computing device 10 to the docking tray 108.

Referring to FIG. 8, the insert member 114 comprises a multi-layered structure 114A and a metallic layer 114B. The multi-layered structure 114A is constructed from polycarbonate material with a thickness of at least 5 mm, providing substantial flexibility and durability. The metallic layer 114B is made of at least one of SS430 stainless steel, soft iron, high-carbon steel, silicon steel, neodymium iron boron (NdFeB) magnets, alnico, cobalt-steel alloys, ferrite magnets, with a thickness of at least 1.5 mm, is engineered to offer magnetic attachment capabilities.

The metallic layer 114B is specifically designed to adhere to the recess 108A of the docking tray 108, enhancing the magnetic interaction with the magnets 119 embedded within the recess 108A. This configuration ensures a reliable and stable attachment of the computing device 10 to the docking tray 108, combining both functional and secure connectivity with ease of removal and installation.

In one embodiment, the metallic layer 114B measures 105 mm in length, 105 mm in breadth, and 1.5 mm in thickness. These dimensions are tailored to provide a secure and stable attachment to the recess 108A of the docking tray 108, enhancing the overall functionality and reliability of the docking mechanism.

Figure 9:
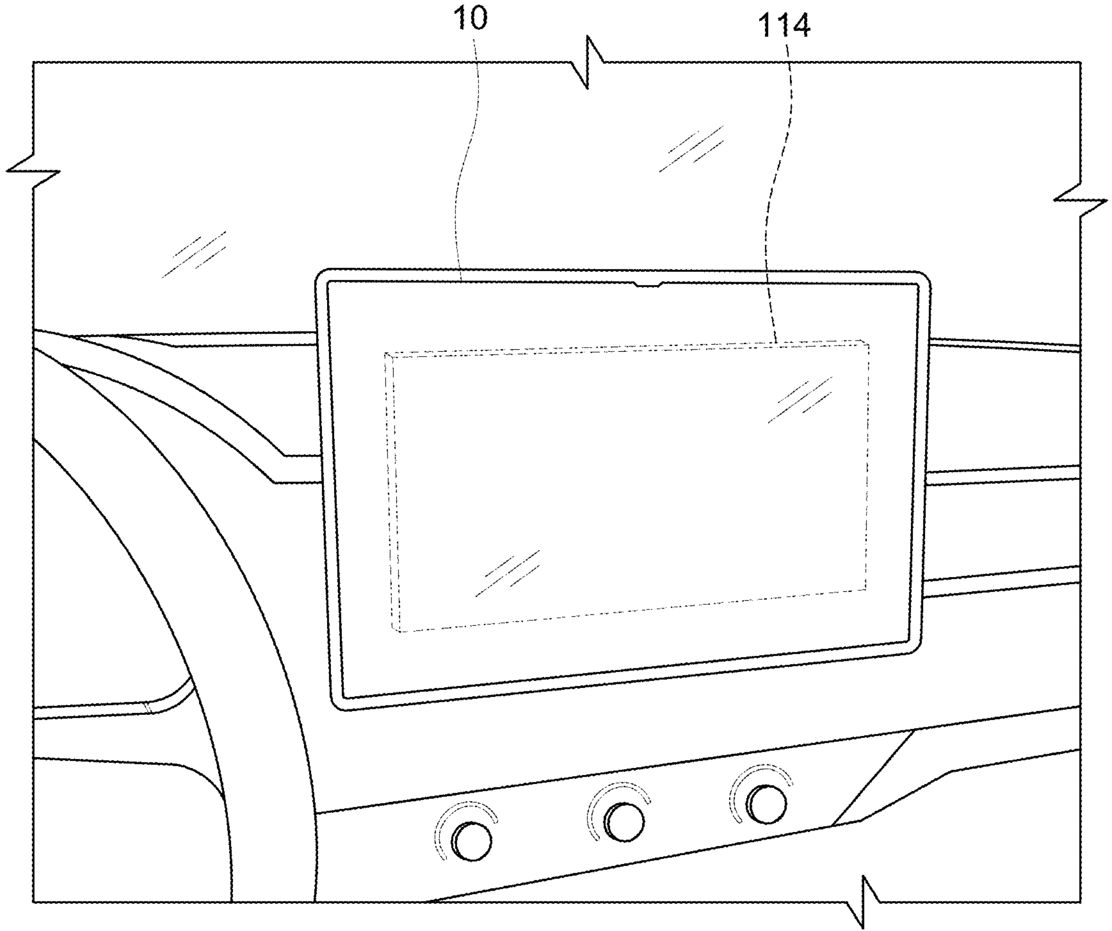
FIG. 9 illustrates a front view of a computing device mounted on the seamless mount apparatus, in accordance with embodiments of the invention.

FIG. 9 refers to a front view of the computing device 10 mounted on the seamless mount apparatus 100. When the computing device 10 is mounted on the seamless mount apparatus 100, it can be used for navigation, entertainment, and backup camera systems to enhance daily commutes. The insert member 114, securely attached to the rear surface of the computing device 10, is inserted into the recess 108A of the docking tray 108. This ensures a stable and reliable mount. The magnetic layer 114B on the insert member 114 adheres to the magnets 119 embedded in the recess 108A, preventing the computing device 10 from falling during sudden movements.

The seamless mount apparatus 100 is designed to accommodate a wide range of the computing device 10 that include, but not limited to, iPads and Android devices, making it versatile and compatible with almost any tablet available on the market. By enabling computing device 10 to be used as navigation and backup camera displays, the seamless mount apparatus 100 improves safety in vehicles that lack built-in infotainment systems or rear cameras, especially when paired with affordable camera hardware. Unlike smartphones, which have smaller screens that can be difficult to use while driving, the seamless mount apparatus 100 allows for the use of the computing device 10 with larger displays, making navigation and other functions easier to view, particularly for individuals with vision impairments.

FIG. 10 refers to a rear view of the computing device 10 that is configured to be mounted on the seamless mount apparatus 100. The insert member 114 is attach to the rear surface of the computing device 10. The insert member 114 is removably inserted into the recess 108A of the docking tray 108, thereby securely attaching the computing device 10 to the docking tray 108.

In one embodiment, the seamless mount apparatus 100 can be easily detached and transferred to a new vehicle, allowing the user to reuse the same mount across multiple vehicles, thus increasing its long-term value. The docking tray 108 with the magnets 119 and sturdy design of the seamless mount apparatus 100 ensure that the tablet remains secure, even when the vehicle encounters rough terrain, sharp turns, or potholes. This prevents accidental falls or movement of the device. The arm 104 is adjustable, allowing the user to easily raise or lower the tablet to access the vehicle's built-in controls or infotainment system without obstruction. Since the seamless mount apparatus 100 allows for the use of a tablet, drivers can keep their smartphones off for the entire trip, reducing distractions from incoming calls, messages, or notifications.

The seamless mount apparatus 100 is designed to be installed or removed within minutes, making it convenient for users who need a fast solution without the complexity of traditional aftermarket infotainment systems. The seamless mount apparatus 100 provides a low-cost alternative to expensive aftermarket infotainment systems, making advanced vehicle features accessible to users without requiring a significant investment. These advantages make the seamless mount apparatus 100 a highly functional, practical, and user-friendly solution for drivers looking to enhance their vehicle's infotainment capabilities.

In one embodiment, the seamless mount apparatus 100 is suitable for installation in various types of vehicles comprise, but not limited to, cars, vans, RVs, semi-trucks, and thereof. This versatility allows the apparatus to adapt to different vehicle configurations, making it an ideal solution for a wide range of transportation applications.

Further, the seamless mount apparatus 100 is versatile and adaptable for installation in both indoor spaces and outdoor spaces. The indoor spaces comprise, but are not limited to, homes, offices, hospitals, and other healthcare facilities, thereby providing flexibility for diverse uses. The outdoor spaces comprise, but are not limited to, parks, gardens, recreational spaces, and other open-air environments where the seamless mount apparatus 100 is necessary.

In some embodiments herein, the seamless mount apparatus 100 is also compatible with various types of transportation vehicles. These vehicles may include, but are not limited to, airplanes, where secure and stable mounting is critical for aviation safety, ships, which require robust mounting solutions to withstand marine conditions, heavy-duty trucks, where the seamless mount apparatus 100 can endure vibration and tough road conditions, and other forms of transport, where durability and adaptability are essential for effective use. This adaptability makes the seamless mount apparatus 100 a versatile solution across multiple industries and environments.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The claimed invention is:

1. A seamless mount apparatus for vehicles, comprising:

a base coupled to a vehicle's dashboard using one or more fasteners;

at least one arm connected to the base through a pivotable hinge member, wherein the pivotable hinge member is configured to rotate the at least one arm between a first position and a second position;

a docking tray having a recess shaped and dimensioned for securing at least one computing device, the recess including one or more magnets disposed beneath a magnet cover;

wherein the docking tray is coupled to the at least one arm through a connector unit, the connector unit including a flange configured to be received within a slot of the at least one arm and secured by a knob, thereby enabling slidable height adjustment of the docking tray relative to the at least one arm;

and an insert member configured to attach to a rear surface of the at least one computing device, wherein the insert member includes an adhesive layer configured to affix the insert member to the rear surface of the at least one computing device and further includes a metallic layer configured to magnetically couple with the one or more magnets in the recess, wherein the insert member is shaped and dimensioned to be removably inserted into the recess of the docking tray, such that magnetic attraction between the metallic layer of the insert member and the one or more magnets within the recess securely retains the at least one computing device within the docking tray.

2. The seamless mount apparatus for vehicles of claim 1, wherein the one or more fasteners include at least one of a clamper, a clip, and a holder.

3. The seamless mount apparatus for vehicles of claim 1, wherein the one or more fasteners include an adhesive material, which comprises at least one of a pressure-sensitive adhesive, a double-sided tape, and a high-bonding adhesive, thereby allowing for non-invasive attachment to the vehicle's dashboard without requiring drilling and permanent modifications.

4. The seamless mount apparatus for vehicles of claim 1, wherein the recess of the docking tray further comprises a magnet cover that conceals and protects the one or more magnets disposed within the recess while allowing secure and seamless attachment of the at least one computing device.

5. The seamless mount apparatus for vehicles of claim 1, wherein the at least one arm is configured with a slot adapted for receiving a flange of the connector unit, wherein the flange is operable secured within the slot through a knob for securely attaching the connector unit to the at least one arm and enabling controlled vertical sliding adjustment of the docking tray.

6. The seamless mount apparatus for vehicles of claim 5, wherein the at least one arm is detachable from the connector unit of the docking tray by loosening the knob, thereby allowing the docking tray to be easily transferred between various vehicles without requiring additional components.

7. The seamless mount apparatus for vehicles of claim 1, wherein the connector unit is positioned at a rear surface of the docking tray.

8. The seamless mount apparatus for vehicles of claim 1, wherein the insert member comprises a layered structure with at least 5 mm thick polycarbonate material and at least 1.5 mm thick stainless-steel material, thereby providing both flexibility and magnetic attachment capability to the recess of the docking tray.

9. The seamless mount apparatus for vehicles of claim 1,
wherein the seamless mount apparatus is configured to accommodate the at least one computing device of varying sizes and types, which include at least one of iPads, tablets, notebooks, smartphones, and chromebooks without compromising stability or functionality, wherein
the seamless mount apparatus is configured to accommodate at least one non-computing device.

10. The seamless mount apparatus for vehicles of claim 1, wherein the base is made of a lightweight material comprises aluminum.

11. The seamless mount apparatus for vehicles of claim 1, wherein the pivotable hinge member is configured to rotate the docking tray coupled to the at least one arm about a plurality of axes, thereby alternating between the first position and the second position.

12. The seamless mount apparatus for vehicles of claim 1, wherein the docking tray is made of a lightweight material comprises aluminum.

13. A seamless mount apparatus for vehicles, comprising:
a base adhesively coupled to a vehicle's dashboard through an adhesive material;
at least one arm pivotally connected to the base through a pivotable hinge member,
wherein the at least one arm is configured to rotate between a first position and a second position;
a docking tray having a recess for housing one or more magnets to magnetically secure at least one computing device, the one or more magnets being positioned beneath a magnet cover within the recess;
a connector unit positioned at a rear surface of the docking tray, wherein the connector unit is configured to slidably couple the docking tray with the at least one movable arm to enable height adjustment of the docking tray, the connector unit including a flange received within a slot of the at least one arm and secured via a knob; and
an insert member configured to attach to a rear surface of the at least one computing device, the insert member including an adhesive layer for affixing to the computing device and a metallic layer configured to magnetically engage the one or more magnets within the recess,
wherein the insert member is shaped and dimensioned to be removably inserted into the recess of the docking tray, such that magnetic interaction between the metallic layer and the one or more magnets securely retains the computing device in the docking tray.

14. The seamless mount apparatus for vehicles of claim 13, wherein the adhesive material includes at least one of a pressure-sensitive adhesive, a double-sided tape, a high-bonding adhesive, thereby allowing for non-invasive attachment to the vehicle's dashboard without requiring drilling and other permanent modifications.

15. The seamless mount apparatus for vehicles of claim 13, wherein the recess of the docking tray further comprises a magnet cover that conceals and protects one or more magnets while allowing secure and seamless attachment of the at least one computing device.

16. The seamless mount apparatus for vehicles of claim 13, wherein the at least one arm is configured with a slot adapted for receiving a flange of the connector unit, wherein the flange is operable secured within the slot through a knob for securely attaching the connector unit to the at least one arm.

17. The seamless mount apparatus for vehicles of claim 16, wherein the at least one arm is detachable from the connector unit of the docking tray by loosening the knob, thereby allowing the docking tray to be easily transferred between various vehicles without requiring additional components.

18. The seamless mount apparatus for vehicles of claim 13, wherein the insert member comprises a layered structure with at least 5 mm thick polycarbonate material and at least 1.5 mm thick stainless-steel material, thereby providing both flexibility and magnetic attachment capability to the recess of the docking tray.

19. The seamless mount apparatus for vehicles of claim 13,
wherein the seamless mount apparatus is configured to accommodate the at least one computing device of varying sizes and types, which include at least one of iPads, tablets, notebooks, smartphones, and chromebooks without compromising stability or functionality,
wherein the seamless mount apparatus is configured to accommodate at least one non-computing device.

20. The seamless mount apparatus for vehicles of claim 13, wherein the pivotable hinge member is configured to rotate the docking tray coupled to the at least one arm about a plurality of axes, thereby alternating between the first position and the second position.

* * * * *